(12) United States Patent
Charles et al.

(10) Patent No.: US 8,930,415 B2
(45) Date of Patent: Jan. 6, 2015

(54) METHOD AND COMPUTER SYSTEM FOR INTERACTING WITH A DATABASE (75) Inventors: Bernard Charles, Feucherolles (FR); Guenole Gicquel, Courbevoie (FR); Francois Perroux, Chaville (FR); Duy-Minh Vu, Paris (FR)

(73) Assignee: Dassault Systemes, Suresnes Cedex (FR)

( * ) Notice: Subject to any disclaimer, the term of this patent is extended or adjusted under 35 U.S.C. 154(b) by 1391 days.

(21) Appl. No.: 11/202,324

(22) Filed: Aug. 10, 2005

(65) Prior Publication Data
US 2006/0136842 A1 Jun. 22, 2006

(30) Foreign Application Priority Data

Dec. 20, 2004 (EP) ..................................... 04293052

(51) Int. Cl.
*G06F 17/30* (2006.01)
(52) U.S. Cl.
CPC ................................ *G06F 17/30557* (2013.01)
USPC ........................................................ 707/805
(58) Field of Classification Search
CPC ........................... G06F 17/30557; G06F 17/50
USPC ....................... 707/1–3, 805; 700/98; 345/619
See application file for complete search history.

(56) References Cited

U.S. PATENT DOCUMENTS

| | | | |
|---|---|---|---|
| 4,701,583 A | 10/1987 | Mitsukuchi et al. | |
| 4,791,583 A | 12/1988 | Colburn | |
| 5,337,407 A | 8/1994 | Bates et al. | |
| 5,345,490 A | 9/1994 | Finnigan et al. | |
| 5,519,627 A | 5/1996 | Mahmood et al. | |
| 5,821,925 A | 10/1998 | Carey et al. | |
| 5,960,173 A | 9/1999 | Tang et al. | |
| 5,973,678 A | 10/1999 | Stewart et al. | |
| 6,113,647 A | 9/2000 | Silve et al. | |
| 6,272,671 B1 | 8/2001 | Fakhry | |
| 6,323,863 B1 | 11/2001 | Shinagawa et al. | |
| 6,445,390 B1 | 9/2002 | Aftosmis et al. | |
| 6,453,328 B1 | 9/2002 | Schaeffer et al. | |
| 6,470,489 B1 | 10/2002 | Chang et al. | |

(Continued)

FOREIGN PATENT DOCUMENTS

| | | |
|---|---|---|
| EP | 1244062 A2 | 9/2002 |
| EP | 1271412 A2 | 1/2003 |

(Continued)

OTHER PUBLICATIONS

European Search Report for EP App. No. 04293052 dated Apr. 12, 2005.

(Continued)

*Primary Examiner* — Sheree Brown
(74) *Attorney, Agent, or Firm* — Baker & Hostetler LLP (57) ABSTRACT

The invention proposes interacting with a database having data related to modeled products and parts using a graphical user interface displayed by a computer. The graphical user interface is adapted to allow a user to access the database. The method also includes providing within the graphical user interface a toolbar with at least one field suitable for displaying an argument. The toolbar is adapted for allowing a user to execute a function using the argument. The method further includes the steps of querying the database and updating the argument displayed in the field using a result of the querying step.

18 Claims, 9 Drawing Sheets

(56) References Cited

U.S. PATENT DOCUMENTS

| | | | |
|---|---|---|---|
| 6,629,065 B1 | 9/2003 | Gadh et al. | |
| 6,636,211 B2 | 10/2003 | Chartier et al. | |
| 6,912,565 B1 | 6/2005 | Powers et al. | |
| 7,176,942 B2 * | 2/2007 | Chartier et al. | 345/619 |
| 2001/0056488 A1 | 12/2001 | Maeda et al. | |
| 2002/0180735 A1 | 12/2002 | Chartier et al. | |
| 2002/0183878 A1 * | 12/2002 | Chartier et al. | 700/98 |

FOREIGN PATENT DOCUMENTS

| | | |
|---|---|---|
| EP | 04293052.9 | 12/2004 |
| EP | 95904108.8 B1 | 7/2005 |
| GB | 2 354 096 | 3/2001 |
| JP | 10-149432 A | 6/1998 |
| JP | 10-240790 A | 9/1998 |
| JP | 11-085826 A | 3/1999 |
| JP | 11-126219 A | 5/1999 |
| KR | 10-2001-0014728 A | 10/2001 |
| KR | 10-2001-0023060 A | 11/2001 |
| KR | 10-1996-0702613 B1 | 7/2002 |
| WO | PCT/KR01/00338 A1 | 10/2001 |

OTHER PUBLICATIONS

Ulrich Sendler, A white paper on state-of-the-art of 3D CAD in an Internet/Intranet-based world, XP-002324225, Oct. 1998, 41 pages.
Rossignac, J. R., O'Connor, M. A., "SGC: A Dimension-Independent . . . ", Geometric Modeling for Product Engineering, M. J. Wozny, J. U. Turner and K. Preiss, Eds., North-Ho 1990.
Sriram, Wong, and He, "GNOMES: an object-oriented nonmanifold geometric engine", Computer-Aided Design, vol. 27, No. 11, pp. 853-868 (1995).
V. Capoyleas et al., "Generic Naming in Generative, Constraint-Based Design", Computer-Aided Design, vol. 28, No. 1, 1996, pp. 17-26.
European Search Report for European Application No. 02290633 dated Feb. 16, 2005.
European Search Report dated Jan. 23, 2006 for EP application No. 02291494.9.
Konduri, G., et al., "A Framework for Collaborative and Distributed for Web-Based Design", Design Automation, Jun. 21, 1999, pp. 898-903.
Hillebrand, G., et al., "Integration-Based Cooperation in Con-Current Engineering", Enterprise Distributed Object Computing Workshop, Nov. 3, 1998, pp. 344-355.
Microsoft Office 2000 Professional Edition 1999, Chapter 12, pp. 265-284.
De Barr, Dennis J.M.J., et al., "Coupling Application Design and user interface design", Proceedings of the SIGCHI Conference, ACM Press 1992, pp. 259-266.
Hill, Ralph D., "The Abstraction-link-view paradigm: Using constraints to connect user interfaces to applications", Proceedings of the SIGCHI conference 1992, pp. 335-342.
Edwards, W. Keith, Flexible Conflict Detection and Management in Collaborative Applications, ACM Symposium on User Interface Software and Technology 1997, pp. 139-148.
Greenberg, Saul, et al., "Real Time Groupware as a Distributed System: Concurrency Control and its Effect on the Interface", Proceedings of 1994 ACM conference pp. 207-217.
Bentley R., et al., "Basic Support for Cooperative Work on the World Wide Web", International Journal of Human-Computer Studies, Jun. 1997, vol. 46, No. 6, pp. 827-846.
Dourish, Paul, et al., "Awareness and Coordination in Shared Workspaces", Proceedings of the 1992 ACM conference on Computer-supported cooperative work, 1992, pp. 107-114.
Greenberg, Saul, et al. "Groupware toolkits for synchronous work", Technical Report 96-589-09, Department of Computer Science, University of Calgary, 1996.
Galli, Ricardo, "Data Consistency Methods for Collaborative 3D Editing", Ph.D. thesis, Universitat de les Illes Balears, Palma de Mallorca, Spain, Nov. 2000.
Bhola, Sumeer, et al., "Responsiveness and consistency tradeoffs in interactive groupware", Proceedings of 7th ACM Conference, Nov. 1998, pp. 79-88.
Bhola, Sumeer, et al., "1/k Phase Timestamping for Replica Consistency in Interactive Collaborative Applications", Georgia Institute of Technology, Jan. 7, 1999, pp. 1-10.
Analysis of boundary representation model rectification Guoling Shen, Takis Sakkalis, Nicholas Patrikalakis May 2001 Proceedings SMA '01 Publisher: ACM Press.
A model for multimodel reference resolution Luis Pineda, Gabriela Garza Jun. 2000 Computational Linguistics, vol. 26 Issue 2 Publisher: MIT Press.
Offsetting operations on non-manifold boundary representation models with simple geometry Sang Hun Lee Jun. 1999 Proceedings, SMA '99 Publisher: ACM Press.
Computing the Voronoi diagram of a 3-D polyhedron by separate computation of its symbolic and geometric parts Michal Etzion, Ari Rappoport Jun. 1999 Proceedings, SMA '99.
Machine interpretation of CAD data for manufacturing applications Qiang Ji, Michasel M. Marefat, Sep. 1997.
A hybrid CAD/CAM system for mechanical applications J.Z. Gingerich, M.P. Carroll, E.J. Chelius, L.P. Kuan, Jan. 1982 Proceedings of the 19th conference on Design automation.
Topological design of sculptured surfaces Helaman Ferguson, Alyn Rockwood, Jordan Cox, Jul. 1992 ACM SIGGRAPH Computer Graphics, SIGGRAPH '92, col. 26 Issue.
"Modeling Primitives": an object oriented formulation of boundary value . . . , Taylor C. Wilson, Jeffrey A. Talbert, Jordan J. Cox Jun. 1993.
Auto CAD 2000 Bible, Ellen Finkelstein, pp. 682-684, 1999.
A constraint-driven solid modeling open environment Wenhsyong Lin, Arvid Myklebust, Jun. 1993 Proceedings on the second ACM symposium on Solid modeling and applications.
AUnified geometric modeling by non-manifold shell operation Masatake Higashi, Hideki Yatomi, Yoshihiro Mizutani, Shin-ichi Murabata, Jun. 1993 Proceedings on the second ACM.

* cited by examiner

METHOD AND COMPUTER SYSTEM FOR INTERACTING WITH A DATABASE

CROSS REFERENCE TO RELATED APPLICATIONS

This application claims priority to European patent application no. 04293052.9 filed on Dec. 20, 2004, which is currently pending.

FIELD OF THE INVENTION

The invention relates to the field of computer programs and systems, and more specifically to a method of collaborative work in computer network, providing a product lifecycle database having data related to modeled products and product parts.

BACKGROUND OF THE INVENTION

Computer-aided techniques include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing operations.

A number of systems and programs are offered on the market for the design of parts or assemblies of parts, forming a product, such as the one provided by Dassault Systemes under the trademark CATIA. These CAD systems allow a user to design and manipulate complex 3D models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are essentially specifications of geometry. Specifically, CAD files contain specifications, from which geometry is generated, which in turn allow for a representation to be generated. Specifications, geometry and representation may be stored in a single CAD file or multiple ones. CAD systems include graphic tools for representing the modeled objects to the designers; these tools are dedicated to the display of complex objects—the typical size of a file representing an object in a CAD system being in the range of one Megabyte per part, and an assembly may comprise thousands of parts. A CAD system manages models of objects, which are stored in electronic files.

In computer-aided techniques, the graphical user interface (GUI) plays an important role as regards the efficiency of the technique.

Also known are Product Lifecycle Management (PLM) solutions, which refer to a business strategy that helps companies to share product data, apply common processes, and leverage corporate knowledge for the development of products from conception to the end of their life, across the concept of extended enterprise. By including the actors (company departments, business partners, suppliers, OEM, and customers), PLM may allow this network to operate as a single entity to conceptualize, design, build, and support products.

Some PLM solutions make it for instance possible to design and develop products by creating digital mockups (a 3D graphical model of a product). For instance, the digital product may be first defined and simulated using an appropriate application. Then, the lean digital manufacturing processes may be defined.

The PLM solution provided by Dassault Systemes (for example under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service. Such PLM solutions comprise a relational database of products. The database comprises a set of textual data and relations between the data. Data typically include technical data related to the products said data being ordered in a hierarchy of data and are indexed to be searchable. The data are representative of the products, which are often modeled objects.

Product lifecycle information, including product configuration, process knowledge and resources information are typically intended to be edited in a collaborative way.

To this respect, a collaborative workspace can be defined as an interconnected environment in which participants in the product lifecycle (design and also marketing, sales, manufacturing, original equipment manufacturers (OEMs), suppliers, and customers) can access and interact with each other's "In-Work" designs, thereby enhancing communication through exchange, direct use, simulation and validation in 3D.

Product data management (PDM) systems refer to tools used to control access to and manage all product definition data of the relational database. This is achieved by maintaining product information (or meta-data).

A PDM solution may automatically store and manage product information and facilitates collaboration throughout the enterprise and across the value chain. A PDM solution may further integrate people and processes by automating and tracking standard workflows within an organization and its supply chain, driving efficiency and accountability, and facilitating standards compliance.

For example, the user may wish to know where a product, e.g. a braking pedal, is also used, that is, in which other models it is embedded. A standard CAD tools enable a user to navigate between parts or products mainly according to the "is composed of" relation. Databases used in PDM systems enable queries to be made on various types of relation between parts or product and the scope of navigation of the databases is the widest possible. In practice, the user can have access to all the parts, products or assemblies, configurations, versions, etc.

Nevertheless, databases do usually not allow the user to easily navigate since the data do not have a graphical representation. Data are identified by file names or types and those names may not be relevant enough to allow for an efficient identification of the items that the user is looking for.

For the sake of completeness, a database is defined usually as a collection of data or information organized for rapid search and retrieval, especially by a computer. Databases are structured to facilitate storage, retrieval, modification, and deletion of data in conjunction with various data-processing operations. A database consists of a file or set of files that can be broken down into records, each of which consists of one or more fields. Fields are the basic units of data storage. Users retrieve database information primarily through queries.

Using keywords and sorting commands, users can rapidly search, rearrange, group, and select the field in many records to retrieve or create reports on particular aggregates of data according to the rules of the database management system being used.

Thus, known solutions of CAD/CAM applications make it possible, among other features, to design parts, while a PDM system typically includes a database storing all the data related to the designed products or parts and the relations between said products or parts. For example, if a user, who is designing a product or a part in a CAD application window, is willing to know which parts will be impacted by his design changes, he has to switch from the design application to a data management application and conduct various queries, using for instance product/part filenames. Those switching and querying operations are to be carried out each time the user wishes to get information stored in the database To this respect, the ENOVIA Solutions make it possible to graphically define, share and manage product, process and resource information stored in a PDM database throughout the product lifecycle process. Among other features, it is provided a graphical tool, which can be displayed in the graphical interface of a CAD/CAM application, and which aggregates user-interactive areas that makes it possible to perform several tasks routinely needed, for example by designers. Such tasks include search-of-part operations, impact assessment operations on the edited parts and update operations. A consistent management of the information is ensured thanks to queries in the PLM database the queries being made directly in the CAD/CAM application window.

Though useful, such a graphical tool is however not optimized with respect to the interaction between a user and the database, notably when a plurality of users, e.g. designers working in a collaborative way, interacts with the database. In fact, this graphical tool does not allow a user to be informed sufficiently early of modifications occurring in the database. In particular, this gives rise to conflicts between users when product parts or products are edited simultaneously by the users as a user is not informed sufficiently early of modifications occurring due to other users. Such conflicts are obviously not desired and have to be detected sufficiently early.

There is therefore a need for a method and a computer system for interacting with a database, allowing for an improved interaction of a user with the database and, if necessary, resulting in reduced conflicts between users of the database.

SUMMARY OF THE INVENTION

The invention proposes a method for interacting with a database having data related to modeled products and product parts, the method comprising: (a) displaying a graphical user interface on a display of a computer, the graphical user interface being adapted to allow a user to access the database; (b) providing within the graphical user interface a toolbar with at least one field suitable for displaying an argument, the toolbar being adapted for allowing a user to execute a function using said argument; the method further comprising the steps of: (c) querying the database; and (d) updating the argument displayed in the field, using a result of the querying step.

In other embodiments, the invention may comprise one or more of the following features:

the steps of querying and updating are carried out as a continuous process;

the steps of querying and updating are carried out upon an action of the user at the GUI;

the action is a selection of an element of a displayed product/part;

the computer is connected to a computer network and wherein the steps of querying and updating are carried out upon action at another computer connected to the network;

the toolbar further comprises a button suitable for user-selection of the function;

the button is associated with a function of product/part search, the method further comprising a step of: displaying a product/part upon execution of the function of product/part search, according to the updated argument;

the button is associated with a function of impact assessment, the method further comprising steps of: selecting a displayed product or part, displaying as an updated attribute the name of said selected product or part in the input field, displaying a graph representative of an impact assessment of the selected product or part upon execution of the function of impact assessment;

the button is associated with a function of communication between the user and another user of the computer network, the method further comprising a step of: selecting a displayed product or part, displaying as an updated attribute the name of the locker of said selected product or part in the input field, displaying in the graphical user interface a communication tool suitable for communication between the user and said locker upon execution of the function of communication;

the button is associated with a function of update of the database, the method further comprising a step of: modifying one or more parts, displaying as an updated attribute the name of the modified parts in the input field, displaying an update tool suitable for updating the database with data related to the product/part, upon execution of the function of update of the database;

the toolbar comprises: a first toolbar area associated with a function of product/part search; a second toolbar area associated with a function of impact assessment; a third toolbar area associated with a function of communication with other users of the computer network; and a fourth toolbar area associated with a function of update of the database with data related to the edited object;

the method of the invention further comprises the steps of: displaying a product or a product part upon execution of the function of product/part search; displaying a graph representative of an impact assessment of a product/part upon execution of the function of impact assessment; displaying in the graphical user interface a communication tool suitable for communication between the user and the other user upon execution of the function of communication; and displaying an update tool suitable for updating the database with data related to the product/part, upon execution of the function of update of the database;

the database queried comprises data representative of three-dimensional modeled parts, the graphical user interface being further adapted for displaying a three-dimensional representation of the parts;

the graphical user interface displayed is a web browser interface;

the graphical user interface displayed is associated with a CAD/CAM/CAE software application;

The invention further concerns a computer system comprising a graphical user interface for interacting with a database having data related to modeled products and product parts, said graphical user interface being displayed on a display of a computer and being adapted to allow a user to access the database, the graphical user interface comprising a toolbar with at least one field suitable for displaying an argument, said toolbar being adapted for allowing a user to execute a function using said argument; the computer system further comprising means for: querying the database; and updating the argument displayed in the field, using a result of the querying step.

The invention is also directed to a computer executable program code stored in a computer readable medium or in a signal, suitable for implementation of the method of the invention.

Various embodiments of the invention are now discussed, in reference to the drawings.

DETAILED DESCRIPTION OF THE INVENTION

The invention proposes a method for interacting with a database having data related to modeled products and product parts. The method comprises (a) displaying a graphical user interface on a display of a computer. The graphical user interface is adapted to allow a user to access the database. The method also comprises: (b) providing within the graphical user interface a toolbar with at least one field suitable for displaying an argument. The toolbar is adapted for allowing a user to execute a function using said argument. The method further comprises the steps of: (c) querying the database; and (d) updating the argument displayed in the field, using a result of the querying step.

Such a method, in particular the querying and updating steps, allow for an update of the displayed argument used by the function to be executed. The user knowledge of the database is improved as the argument displayed after query better reflects the current state of the database. Interaction with the database is therefore improved. Further, in the case of a plurality of users interacting with the database, the risk of conflicts between the users is lowered. For example, when a first user is editing a first part and a second user is modifying a second part that has to be in contact with the first one, the first user will be informed of the modification thanks to the toolbar. The update of the argument further results in an enrichment of the toolbar, possibly without requiring user intervention.

Figure 1:
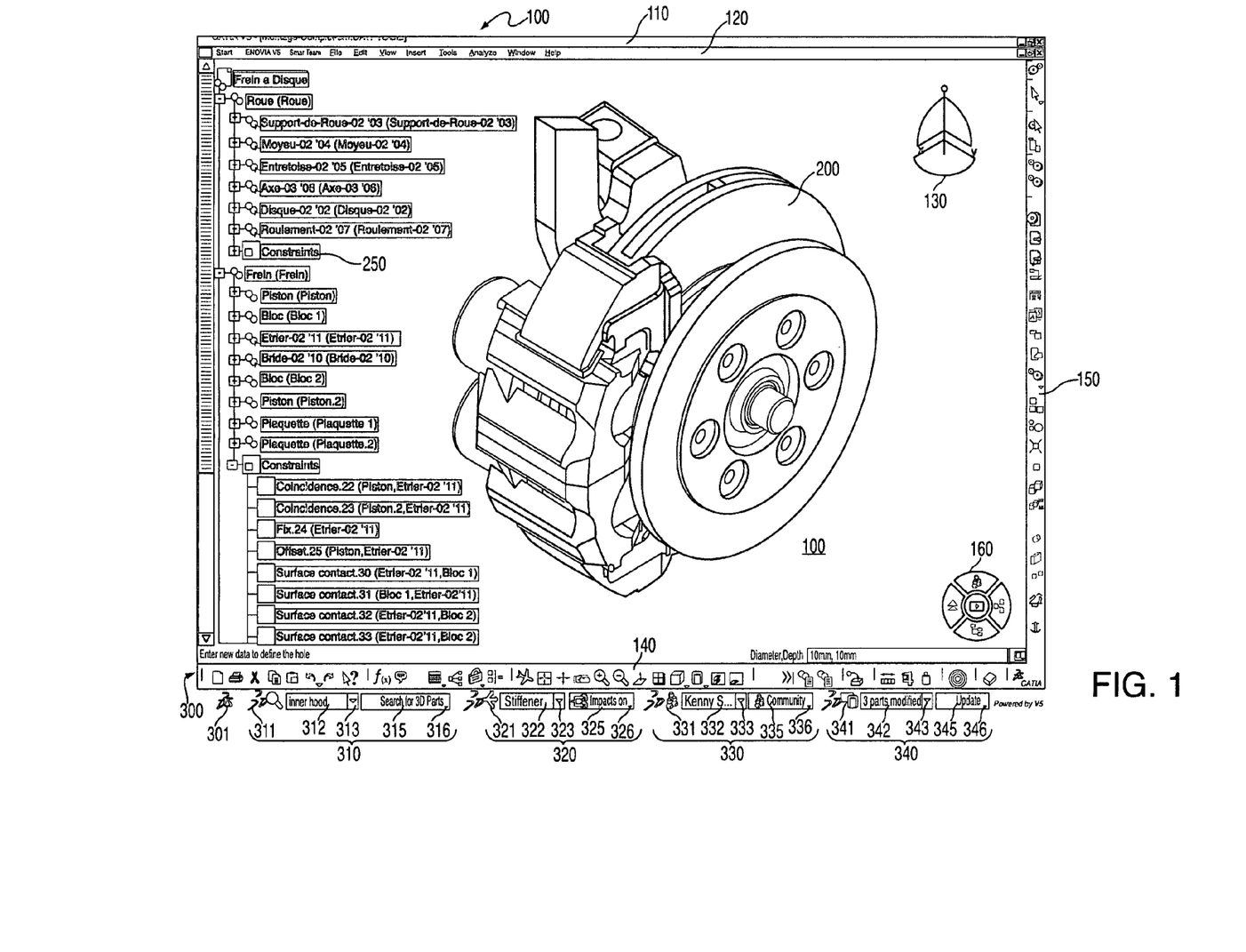
FIG. 1 is an exemplified display of a graphical user interface showing a toolbar with several toolbar areas, according to an embodiment of the invention.

FIG. 1 is an exemplified display of a graphical user interface showing a toolbar with several toolbar areas, according to an embodiment of the invention.

In reference to FIG. 1, the exemplified graphical user interface (or GUI) 100 may be a typical CAD-like interface, having standard menu bars 110, 120, as well as bottom and side toolbars 140, 150. Such menu- and toolbars contain a set of user-selectable icons, each icon being associated with one or more operations or functions, as known in the art.

Some of these icons are associated with software tools, adapted for editing and/or working on a modeled product 200 or parts of product 200 such as that displayed in the GUI 100. In the following description, "product", "part", "assembly" and the like may be referred to as "part" for the sake of simplicity. The software tools in question may be grouped into workbenches. Otherwise put, each workbench comprises a different subset of software tools. In particular, one of these is an edition workbench, suitable for editing geometrical features of the modeled product 200. In operation, a designer may for example pre-select a part of the object 200 and then initiate an operation (e.g. change the dimension, color, etc.) by selecting an appropriate icon. For example, typical CAD operations are the modeling of the punching or the folding of a 3D modeled object displayed on the screen.

The GUI may for example display data 250 related to the displayed product 200. In the example of FIG. 1, the data 250, displayed as a "feature tree", and their 3D representation 200 pertain to a brake assembly including brake caliper and disc. The GUI may further show various types of graphic tool 130,160, for example for facilitating 3D orientation of the object, for triggering a simulation of an operation of an edited product or render various attributes of the displayed product 200.

As an example of embodiment, the method of the invention is implemented in a computer network comprising user computers and one or more product data management (PDM) system. The user computers are in communication with the PDM system. The PDM system may for example be located at a backbone of the network. The PDM system allows for the management of numerous documents, relations and data, possibly hierarchically interrelated. Such a PDM system is equipped with a product lifecycle database having data related to modeled products, assemblies and product parts, which are likely to be edited by a designer. A plurality of users may thus work in a collaborative way, on different parts/products/assemblies.

As will be detailed below, the GUI 100 is adapted for allowing access to the product lifecycle database, either on users request or as a background task, in contrast with existing CAD/CAM interfaces. Thus, in operation, a user who wishes to access the database does not have to pass from a first CAD window to a PDM window (for example by minimizing the first window and maximizing the second window), adapted for querying the database, and then go back to the CAD/CAM window. Such window switching operations, frequently carried out by designers, are time consuming and particularly inappropriate in the field of CAD/CAM.

The GUI 100 is run on one user computer of the network, having a display and memory. For instance, GUIs similar to that identified by reference numeral 100 displayed in FIG. 1 may be run on other computers of the network. These computers may further benefit from similar local applications and a common environment.

In particular, the GUI 100 exhibit a displayable toolbar 300 comprising one or more toolbar areas. In the embodiment of FIG. 1, the toolbar 300 comprises four such toolbar areas 310,320,330,340. Each area of the toolbar is associated with one or more functions or tasks, which are likely to be selected by a user and will be described in details later. Such functions are directly or indirectly initiated via selection of the associated area. The toolbar 300 is preferably tagged with an icon 301 for the sake of an easier recognition by user.

Should the toolbar exhibit several toolbar areas associated with typical designer tasks, the general structure and functioning of each of the areas is preferably the same, so as to make designer routine work easier.

Each of the four toolbar areas of FIG. 1 shows user-selectable and/or editable sub-areas such as an input filed 312,322, 332,342, displaying an argument used by a function to be performed. Each of the areas further shows preferably a button 315,325,334,345, suitable for user-selection of a function to be performed. The buttons may display the name of the function, e.g. "Impacts on". In addition, each of the input fields and buttons of the toolbar areas may be supplemented by pull-down menu buttons (respectively denoted by reference numbers 313,323,333,343 and 316,326,336,346) for displaying more arguments or functions. Subsequent menus may allow a user to access detailed pull/pop-down/up menus, whereby arguments and functions may for instance be edited, selected or input, as will be explained later.

A first toolbar area 310 may generally be associated with search operations; a second toolbar area 320 may be generally associated with impact assessment operations. A third toolbar area 330 may be generally associated with operations of collaboration in a collaborative workgroup, for instance like chat/communication with other designers. Said collaborative workgroup may for example be composed of people sharing a collaborative workspace such as co-designers and project supervisors. A fourth toolbar area 340 may be associated with modifications delivery functions for updating the database and inform the collaborative workgroup.

The above structure allow for an efficient access to routine tasks of the designer. In particular, the third toolbar area 330, dedicated to collaborative work, may help the designer to quickly contact other designer and thereby solve conflicts inherent to collaborative work in network.

In operation, a user may select the input field, for instance thanks to its mouse, directly enter the desired argument (for example the part name "inner hood" in the input field 312 of the "search" area) or possibly activate a pull/pop-down/up menu by clicking the appropriate button (for example the button 313 in the "search" area) for accessing advanced options of argument selection, as will be described later. The user may for instance proceed the same way in order to select a desired function to be performed. As regards the execution of the function, various operation modes may be envisaged. For example, once the argument and function have been selected by the user, the latter may click an associated icon button 311,321,331,341 in order to trigger the execution of the function. Though not compulsory, such icon buttons 311, 321,331,341 have advantages in terms of ergonomics. Such buttons may further be tagged with intuitive icons.

In another preferred embodiment, buttons 315,325,335, 345 may remain hidden until the user passes the mouse pointer over the corresponding toolbar area, for example over the input field 312,322,332,342. Said function buttons would then appear and remain displayed in the toolbar, together with pull menu buttons 316,326,336,346. As before, such buttons 316,326,336,346 may, upon user selection, allow for pulling up/down menus, making it possible to choose among various function options. After selection of a function to be executed, the user may click on the icon button 311,321,331,341 (user selectable in this case) to trigger the execution of the function using a previously selected or default argument.

In an embodiment, the toolbar 300 may advantageously allow for bringing application windows inside the main GUI frame, the application windows being associated with functions of toolbar areas (that is, the "search", "impact", "collaborate" and "propagate" areas). Such application windows may for instance be initiated from the toolbar 300 via selection of respective area fields, buttons or menu icons. Once selected, an application window may appear in the main GUI display as a simplified window, typically of a reduced size compared with the main GUI window. In alternate embodiments, various modes of application window can be envisaged. The dedicated application window may for instance be displayed as a full main application or as a simplified application (with a reduced number of options as compared with the standard one) and/or benefit from a layout decomposition (for example a grayed application window display in background) so as to allow for an easier visualization. The application window may comprise various fields, for argument/function selection. Further, once initiated, the window becomes preferably the active windows, so as to allow the user to a direct (and thus efficient) selection of arguments/functions.

As mentioned above, the method according to the invention, in particular the querying and updating steps, allow for an update of the argument displayed in the input field 312 (or equivalently the field 322, 332 or 342). The update of the argument allows for an improved knowledge of the database and thus an improved interaction with it.

To this respect, the steps of querying and updating are preferably carried out as a continuous process, at a given rate. Thus, the argument displayed is continuously updated. The rate of querying and updating can be set according to various possible criteria, such as the performances of the network. The query rate may further be chosen periodic, though this is not compulsory. Accordingly, the user may thus decide whether carrying out the function or not, depending on the state of the updated argument.

Alternatively, such steps of querying and updating may be carried out "on-the-fly", upon an action of the user at the GUI. This action could for instance consist of selection by the user of a part, in the displayed 3D representation or within the feature tree 250. The action could else amount to a selection at the toolbar 300. In both cases, the user action takes place before execution of the function. Therefore, the argument is updated before executing the function. Once updated, the user may thus decide whether carrying out the function or not. Compared with the above case of continuous process, such a solution is less demanding in terms of performances, e.g. requires less network resources.

In an embodiment, the argument and/or the function names displayed in the toolbar area are corresponding to last user inputs, therefore available as default parameters. To this aim, the method according to the invention keeps a history of the displayed argument/function name in the field/on the button after execution of the function. This prevents from substantial loss of time, since a user has to repeatedly use the same function and argument. In the same spirit, the fields of the toolbar may be configured so as to display "positive" cleaver messages, so as to optimize user guidance.

Figure 2A:
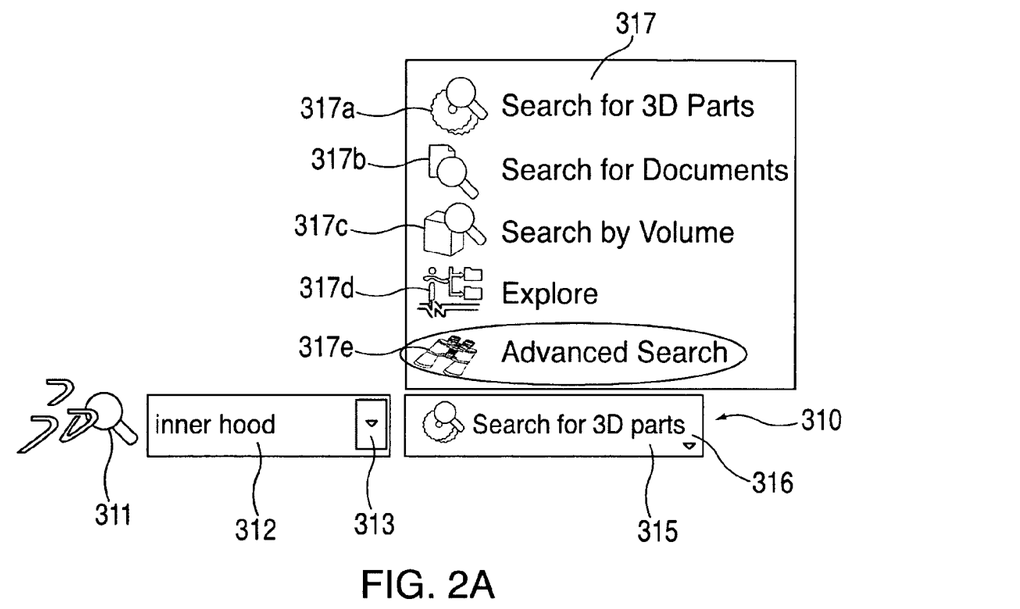
FIG. 2A shows a first toolbar area of the toolbar of FIG. 1, associated with product search functions, when operated by a user.

FIG. 2A shows a first toolbar area of the toolbar of FIG. 1, associated with product search functions, when operated by a user, dedicated to search queries in the database.

In reference to FIG. 2A, a designer may initiate a design session and, to this aim, may take advantage of an already known part or product designs, locally or remotely stored in the database. The designer will therefore initiate a search operation by selecting an appropriate field in the toolbar area 310. The selection may for example be operated through a single mouse click in the field.

The toolbar area 310 shown has the same sub-areas described above, that is, an input field 312 displaying an argument used by a "search" function to be performed, and a button 315, suitable for user-selection of a "search" function. This button is able to display the name of the function, that is, "Search for 3D part". In addition, each of the input field and button are supplemented by pull-down menu buttons 313, 316, whose contents are revealed only when the user activates it. This can normally be carried out by pressing the mouse button while the mouse pointer passes over the button 313, 316, whereupon the menu items appear above/below the title.

As explained, in operation, a user may directly input the name of a product part or product to be searched in the field 312. Alternatively, the user may click the pull-button 313 to pull a menu wherein other part/product names are listed, which are likely to be selected. The parts or products in the list may be preferably arranged according to a criterion of most-used or most-recently-used parts, etc., for obvious efficiency reasons. In the case of a "Search by volume" option (see below) the input field 312 may display the name of the selected part (in the feature tree 250 or on the screen), if necessary. If nothing is selected or input, the input field 312 may display a positive message such as "Ready to search" for example.

Next, the user might select the desired "search" task or function via the pull button 316, by pulling up a menu 317, as illustrated in FIG. 2A. The menu 317 thus appearing comprises a list of items 317 a-e corresponding to various search options.

In the embodiment of FIG. 2A, a function associated to menu item 317 a-e may be selected by first clicking the right pull button 316, whereupon the menu is pulled-up (as illustrated in the FIG. 2A), and then by clicking the desired item 317 a-e or associated function title: for example "Advanced Search" (as outlined in FIG. 2A with border). Alternatively, the menu may be configured so as to allow user selection of the function by first passing the mouse pointer over the menu button field 315, where a last-used function is displayed ("Search for 3D parts" in this case), which automatically triggers the pulling of the menu 317. Then, the user can select the desired function by pressing the mouse button while the mouse pointer passes over the field dedicated to the desired option. The accessible operations may accordingly benefit from the versatility of standard taskbar pull-down menus, which reveals particularly advantageous in practice. The search function is then carried out as a query in the database, for example upon clicking the icon button 311. Upon completion, it is for example displayed a list of search results in a new window.

As regards the possible search functions, the following options are preferably available to the user when activating the pull menu 317.

1. A "Search for 3D Parts" option 317 a, whereby the user can carry out a textual search among the attributes of the 3D representation of the available parts.

2. A "Search for Document" or "Search for 3D Representations" option 317 b, whereby the user can carry out a textual search among the attributes of documents, said documents comprising for example drawings or clash results. For example, when the user inputs "Inner hood clash", the system will conduct the search among the clash results documents comprising the words "inner hood".

3. A "Search-By-Volume" option 317 c, whereby the user is invited to enter a volume criteria (e.g. minimum/maximum volume), with which the searched part should match. The volume may be defined by inputting values in a dialog box and by handling a 3D box. For example, the user may also input a zone name (e.g. engine, front wheelbase) representing a predefined volume zone.

4. An "Explore" option 317 d, allowing the user to load a search workbench like an exploring window, suitable for navigation in the database.

5. An advanced search option 317 e, loading an advanced search mask.

Other search options could obviously be implemented, such as a search-by-sketch, whereby a user is invited to sketch a schematic representation of the desired part, according to which the search function is to be carried out.

In an embodiment, the search menu 317 may be "installed" on the screen, for example by clicking and holding the mouse pointer on the appropriate search field or item 317 a-e and dragging it into a desired location in the screen. The installed search field may then be spanned as a task pane having convenient dimensions, for example for facilitating the sketch of an object part when performing a search-by-sketch.

Figure 2B:
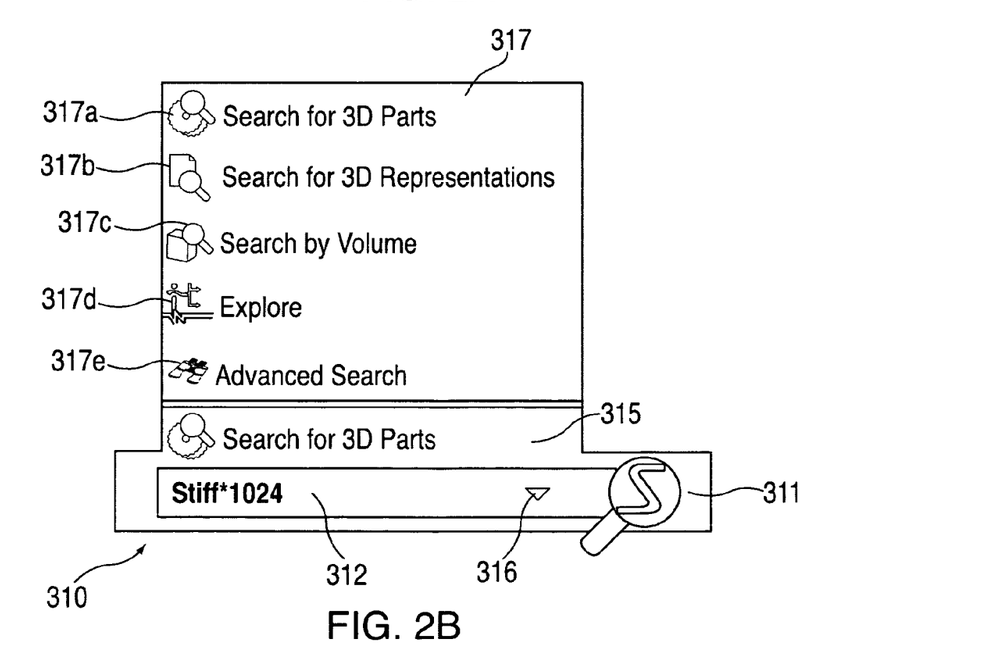
FIG. 2B shows an alternate embodiment of FIG. 2A.

FIG. 2B shows an alternate embodiment of FIG. 2A. In the embodiment of this figure: the toolbar search area 310 shown comprises an input field 312, a pull/pop-down/up menu button 313 and an icon button 311. In operation, a user may select the input field, for instance thanks to its mouse, directly enter the desired argument (for example the part name "stiff* 1024" in the input field 312 of the "search" area 310). When passing the mouse pointer over input field 312, the last-used function (here "Search for 3D parts") pulls up, as displayed in the field 315, as a reminder for the user. Thus, the user may click the associated icon button 311 in order to directly trigger the execution of the last-used function. No selection of the function is required as it is pre-selected. This makes it possible to save a non-negligible time. However, when the user wants another function to be carried out, he or she may select it via the pull button 316, whereby a menu 317 is pulled up. The menu 317 comprises the list of items 317 a-e corresponding to the various search options described above, which may be selected and then triggered via button 311 in addition, though not represented, each of the toolbar areas decomposes and may be operated the same way as the area 310 represented in FIG. 2B. Incidentally, notice that the general design of the toolbar is slightly changed, compared with embodiment of FIG. 2A. Now, referring back to the routine work of the designer, once the search is completed and the part located, the corresponding document is loaded and the running GUI 100 renders for example data 250 and a 3D representation 200 of the part, referring here back to FIG. 1.

The designer may at this stage choose to modify the loaded part. To this aim, the designer may use the application tools available via the standard toolbar icons 140,150 (see FIG. 1) of the GUI 100.

As an example, referring back to FIG. 1, wherein the GUI displays a brake assembly 200: the user may primarily wish to modify the dimensions of the brake disk, which is attained by selecting and operating the appropriate tool, available from one of the standard toolbars 140,150.

Figure 3:
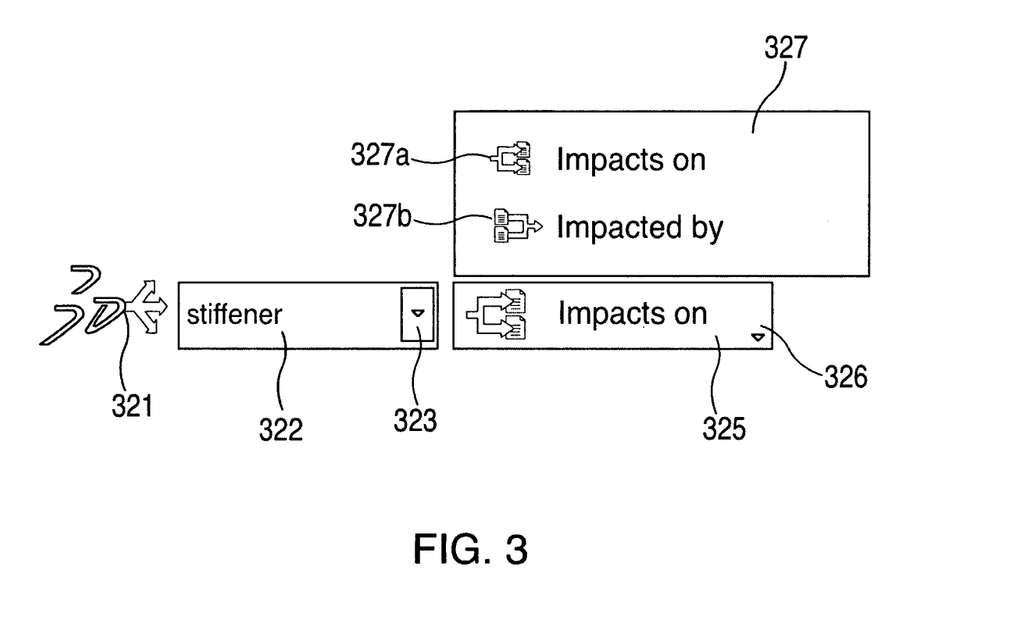
FIG. 3 shows a second toolbar area of the toolbar of FIG. 1, associated with product impact assessment functions, when operated by a user.

FIG. 3 shows a second toolbar area of the toolbar of FIG. 1, associated with product impact assessment functions, when operated by a user.

The designer may wish to draw the eventual consequences its modifications, e.g. that of the brake disk in the previous example, on other parts, whatever the other part are loaded/displayed or not. To achieve this, the user may trigger an impact assessment function by selecting the associated toolbar area 320.

The general operation of this toolbar area is preferably similar to that of the search area, as mentioned above. In particular, the impact area 320 of FIG. 3 exhibits an icon 321, an input field 322 and contiguous pull button 323, a function button 325 and contiguous pull-menu button 326 as in sub areas 311,312,313,315,316 of FIG. 1. In another embodiment, the icon 321 may be user selectable, adapted for triggering an impact assessment function, the button 325 reducing in this case to a display area for the impact options, possibly remaining hidden until the user passes the mouse pointer over the input field 322 or the icon 321, as described above.

If no part is selected, the input field may display a positive message, e.g. "Ready for selection".

Then, a user can select a part name thanks to the input field 322 or via the associated button 323. The user can also select a part in the feature tree 250 or among the 3D representations of the displayed products and parts. The name of said selected part will be displayed in the input field 322. The button 323 may expand a drop-down list of selected parts or a list of the recently objects used for subsequent impact analysis. In the case of a multi-selection of n parts, the input field may display a message like "n parts selected", while the drop-down list may display the names of said selected parts. The user can then select an impact function type via button 326. In particular, the user is given the possibility, via the menu 327, to choose among two impact assessment options which are "Impacts on" 327 a, and "Impacted by" 327 b. The option "Impacts on" allows the users to visualize how the edited part impacts on other parts of the global product. Conversely, the second option "Impacted by" 327 b allows for visualizing which parts of a product do actually impact on the currently selected part, which name is displayed in the input field 322.

It should be understood that the "impact" notion may, in alternate embodiments, go beyond the single geometric nesting of the product parts and covers chemical, physical relations as well as fluid and electric communications between parts.

Once the impact function has been selected, it is then carried out, for example upon clicking the icon button 321, in the embodiment of FIG. 2A. By so doing, a query is sent and a solver is called. The solver identifies the remaining parts of the object, which are impacted by or impact on the currently selected part.

Figure 4:
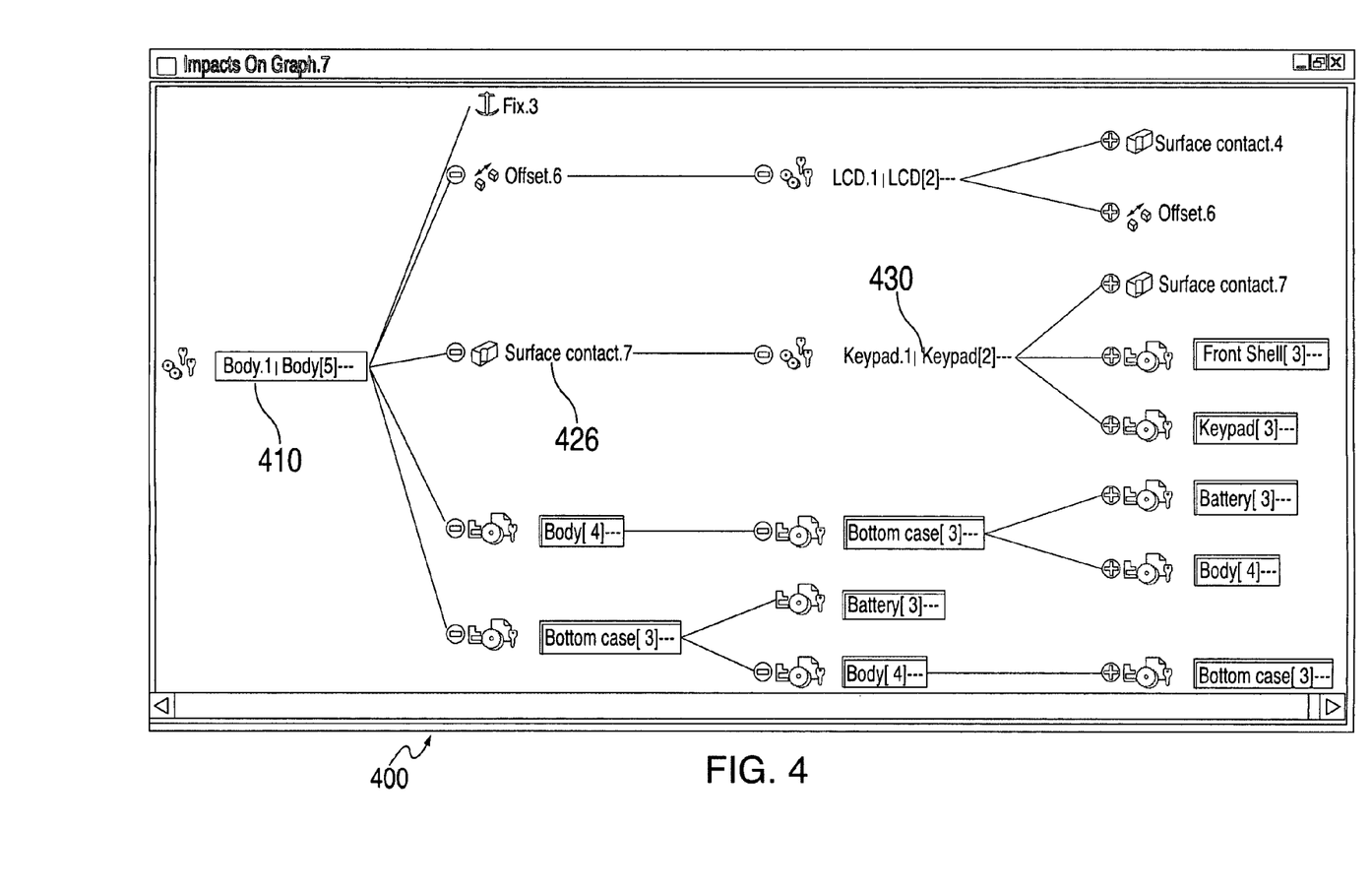
FIG. 4 is an exemplified display of an impact assessment graph, resulting from the operation of FIG. 3.

FIG. 4 is an exemplified display of an impact assessment graph, resulting from the operation of FIG. 3.

Referring now to FIG. 4, the result of the carrying out of an "impact on" assessment function may be displayed as a window 400 showing a "branching diagram". Such a diagram represents schematically the various impacts, as known in the art. As exemplified in FIG. 4, the selected part 410, whose name is "Body.1|Body[5]—", is shown to impact other parts, such as "Keypad.1|Keypad[2]—" 430, "Body[4]" or "Bottom case[3]" for example. The impact type can further be identified according to an appropriate code 426, here "Surface contact.7". Notice that the above part names may be tagged with an appropriate sign or icon, representing a state or an attribute of that part, e.g. a lock/unlock status for such a part.

It is to be put emphasis on the fact that the impact assessment, as well as the previous search, can be performed directly from the CAD/CAM graphical user interface 100. Such operations do not require opening a new window as the toolbar 300 is embedded in the editing application.

Various functionalities could be implemented, in alternate embodiments. For instance, each part thus identified in the solver window may subsequently be selectable by the user so as to allow for a search operation related to the selected part (for example from a menu pulled upon right-clicking a part name identified in display 400).

During a design session, since replacing or modifying a part may impact on neighboring parts in the object, the designer will, in operation, be led to perform loops between either a search or a design operation on the one hand and the impact assessment operation on the other hand.

Figure 5:
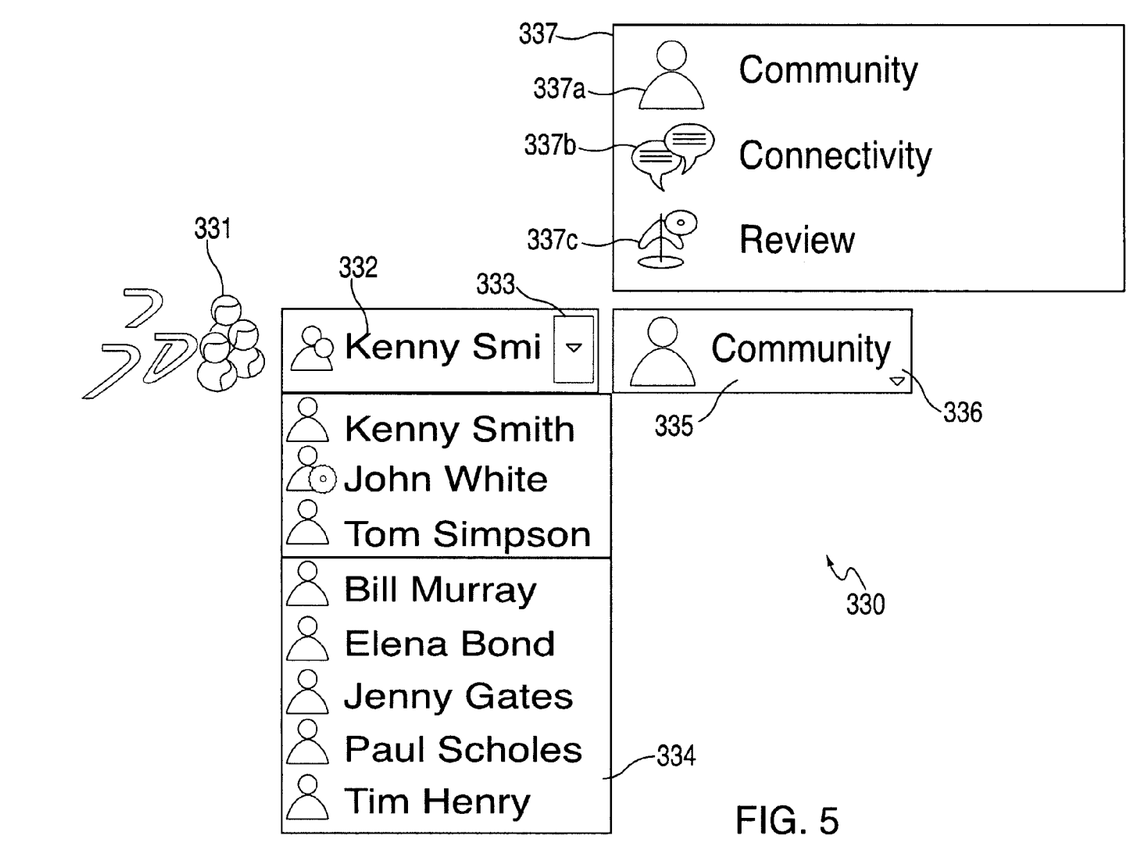
FIG. 5 shows a third toolbar area of the toolbar of FIG. 1, dedicated to collaborative work functions, when operated by a user.

FIG. 5 shows a third toolbar area of the toolbar of FIG. 1, dedicated to collaborative work functions, in operation.

Referring now to FIG. 5, a designer, who is currently designing a part, may wish to contact other users connected to the network via other computers or make information available to them. To this aim, the user may trigger a "collaborate" function by selecting the associated toolbar area 330.

The general operation of this toolbar area is preferably similar to that of the search and impact areas. In short, the "collaborate" area 330 of FIG. 5 exhibits an icon 331, an input field 332 and contiguous pull-down button 333, a function button 335 and contiguous pull-up menu button 336 as in sub areas 311,312,313,315,316 of FIG. 1.

In particular, clicking the menu button 333 pulls down a list 334 of people. These people are denoted in the list either by their names and/or an icon. In addition, the user names may be tagged with icons representative of the hierarchy, the role or the rights of users regarding the currently selected part.

In FIG. 5, when the designer first selects a part (in the feature tree 250 or in the window by clicking on it), a query is sent to the database and the name of the locker of said part is displayed in the input field 332. If the user then pulls down the list 334 of users, this list may preferably disclose, from the top: the part locker, part owner and reviewer in a first section. Then, in a secondary section, the list may disclose the names of the community users who have been recently contacted.

In case of a multi-selection of parts, the input field 332 may for example display "n people", while a drop-down list (accessible thanks to the button 333) may give access to people listed by names and sorted by role. In addition, the connectivity status (away, active, do not disturb, etc.) of the displayed names may also be represented thanks to an icon for example, said status being updated in real-time, for example as a continuous process.

When clicking the menu button 336, the menu 337 is pulled-up, making available several options for collaborative work, as denoted by references 337 a-c.

In the embodiment of FIG. 5, the item "Community" 337 a is intended for displaying information about the community of users related to a selected part or product. Once the user has selected the "Community" option, a new window pops up and a part can be dragged and dropped in that window to trigger the display of lists of the people involved in the design of the selected part, sorted by roles, organization, etc. The item "connectivity" 337 b is intended for quick transmission of information between the user (launch a chat for example) and a displayed user. The user may thus select both a party (e.g. another user in the community) to contact and the "connectivity" item via input field 332 and buttons 335,336—as explained before.

In one embodiment, given the typical part document memory sizes in CAD, it might be advantageous to provide the transmission of an hyperlink pointing at the part document in the "connectivity" receiver windows, for instance by dragging and dropping a part name or a part directly in the input field 332. This allows the other party for accessing the part document without requiring a direct transmission though the network.

The third item "review" 337 *b* allows for initiating a cooperative review with the person the name of whom is displayed, in order to share a session. The associated function may also use a list of users, start date, list of reference to data, etc.

Accordingly, selecting "Community" will not interact with the displayed users, in contrast with "Connectivity", the selection of which may launch a chat session with the currently displayed user if it is active, otherwise information message is displayed, e.g. "user not available". Selecting "Review" will initiate a cooperative review. Further, any action related to a community user may be added in the history list of a dedicated combo box during the working session.

In alternate embodiments, the input field 332 of the "collaborate" area may be in a state "ready to chat" and this, from the launching of the GUI or that of the toolbar, if no part is selected or if the selection does not correspond to any people of the community.

Figure 6:
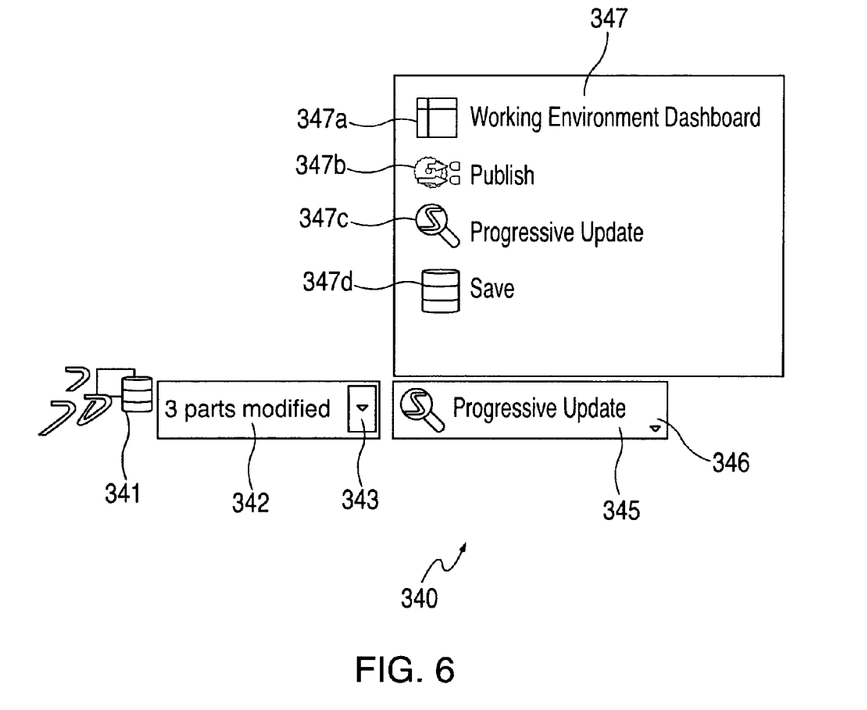
FIG. 6 shows a fourth toolbar area of the toolbar of FIG. 1, dedicated to functions of modification propagation, when operated by a user.

FIG. 6 shows a fourth toolbar area of the toolbar of FIG. 1, dedicated to functions of modification propagation, intended for updating the database and informing the collaborative workgroup, when operated by a user.

The general operation of this toolbar area 340 is preferably similar to that of the "search", "impact" and "collaborate" areas. This fourth toolbar area 340 exhibits an icon 341, an input field 342 and contiguous pull-down button 343, a function button 345 and contiguous pull-up button 346 as in sub areas 311,312,313,315,316 of FIG. 1.

In particular, the input field 342 may for example, at least at the beginning, display the number of parts already modified in a current session (as illustrated in FIG. 6), while clicking the pull-down button 343 may expand a list 344 of names of the modified parts. It may further be possible to provide that selecting a part name highlights said modified parts in the feature tree 250 and/or in the 3D representation in the window (when available).

If no part is modified, the input field 342 may display a positive message such as "Ready to work", or a warning message such as "Save lock problem" or "Maturity problem", with an indication of the part involved in the drop-down list of the input field 342.

As before, the button 345 may trigger the displayed function and subsequently display a last user choice. In another embodiment, the icon 341 may be user selectable, suitable for triggering the associated function. When buttons 341 (or 345 depending on the embodiment) is selected, a query is sent to the database to perform the associated function, according to the selected option 347*a* to 347*d*.

When clicking the pull button 346, the menu 347 is pulled-up, giving access to various options for the associated function, as denoted by references 347 *a-d*. For example, clicking the field "Working Environment Dashboard" 347 *a*, may display a new window in the GUI, as will be described in reference to FIG. 7.

In the embodiment of FIG. 6, four such options are available from menu 347, intended for guiding a user through the database update process. Obviously, their number and functionality may be adapted depending on the context and database complexity.

The "Publish" option 347*b* enables the user to make available to the other users some of the parts or products he is currently working on.

The "Progressive update" option 347*c* launches an assistant that enables a user to update some parts that are linked (through constraints for example) to parts that he modified during his session.

The "Save" option 347*d* allows for updating the database with the modified parts/products.

Figure 7:
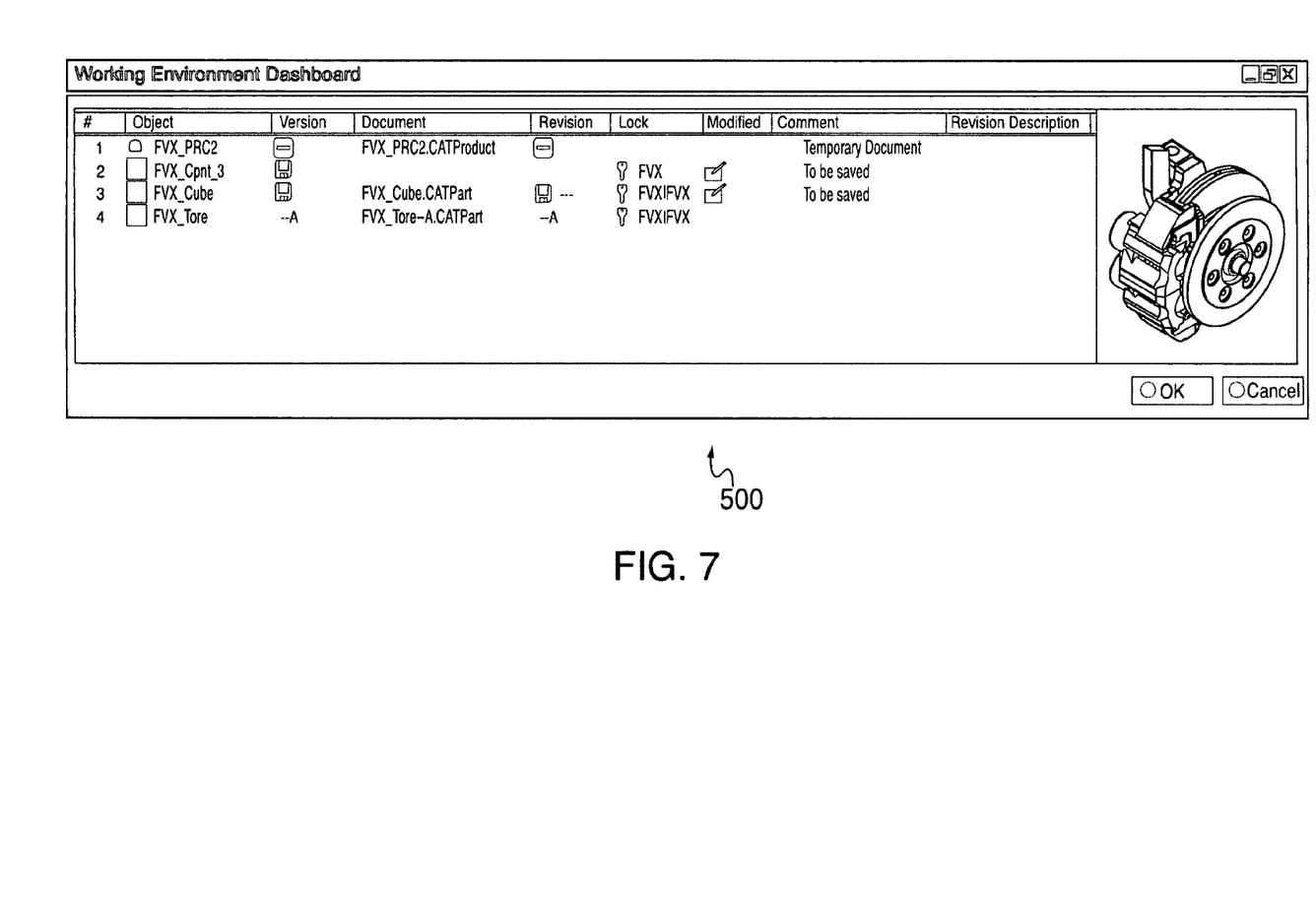
FIG. 7 is an exemplified display of a working environment dashboard window, as appearing when operating the fourth toolbar area of the toolbar of FIG. 1.

FIG. 7 is an exemplified display of a working environment dashboard window, as appearing when operating the fourth toolbar area of the toolbar of FIG. 1 and when the "Working Environment Dashboard" option has been selected.

In reference to FIG. 7, the "Working Environment Dashboard" 500 may be displayed in the GUI upon user selection, as a standard window. In an alternate embodiment, such a window may be dropped/pulled upon clicking on or passing over the corresponding icon or field (denoted by reference number 347 *a* in FIG. 6)

Such a dashboard typically comprises several fields like "Object", "Version", etc., containing icons and/or comments, allowing the user to get an overview of his session in order to solve the issues if any. This dashboard comprises a list of the parts included in the working environment of the user, their status (modified, created, versions, potential issues, etc.).

Figure 8:
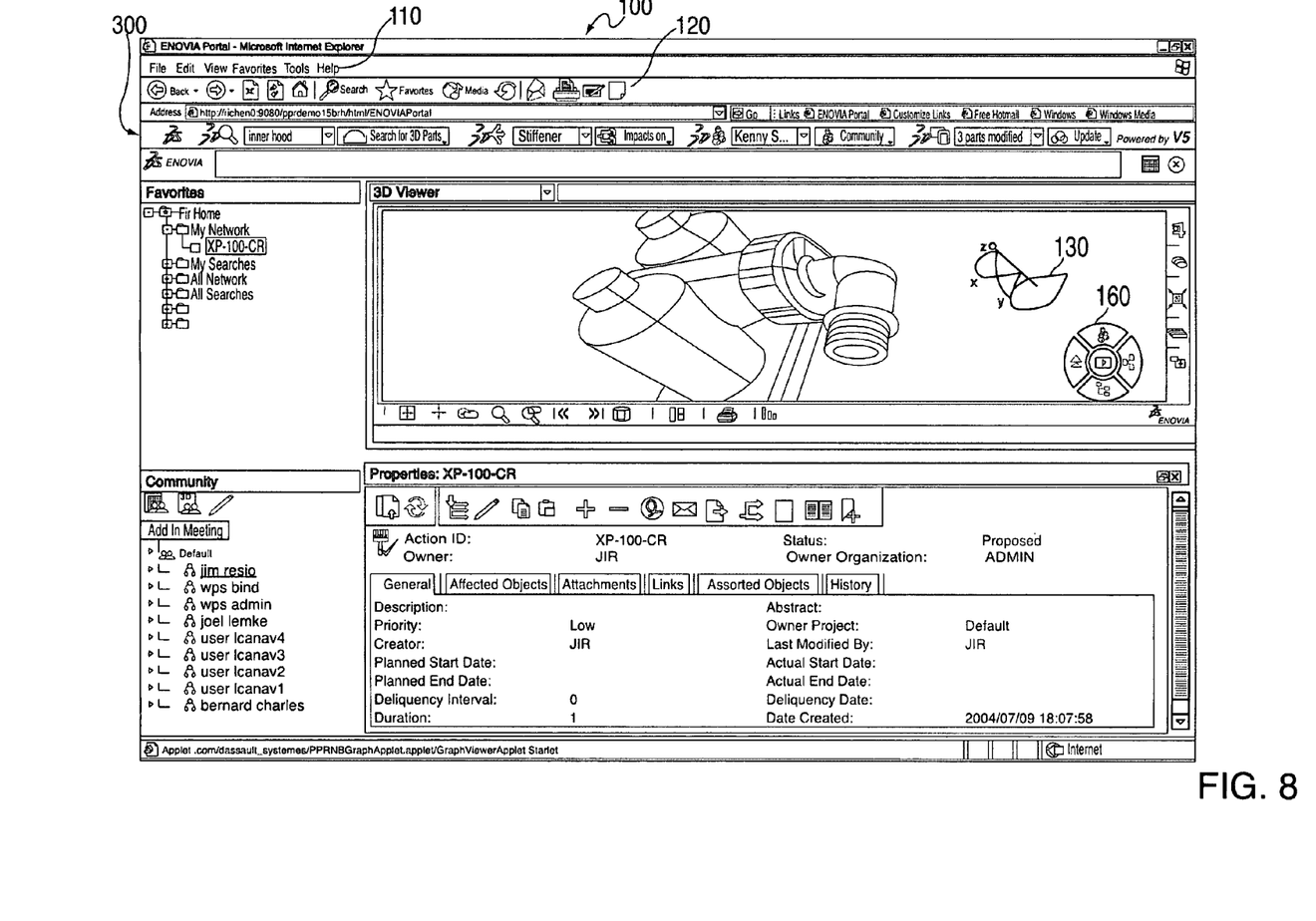
FIG. 8 is an exemplified display of a web-like graphical user interface with an embedded toolbar, according to an embodiment of the invention.

FIG. 8 is an exemplified display of a web-like graphical user interface with an embedded toolbar, according to an embodiment of the invention.

The GUI 100 is somewhat different in this case, compared to that of FIG. 1. Several graphical tools 130, 160 may still be immersed therein. The GUI 100 further comprises a standard menu bar 110, supplemented with a web-like command bar 120. In such an embodiment, the toolbar 300 is more likely to be inserted on top of the GUI 100, below the web-like command bar 120. The toolbar 300 comprises four toolbar areas, allowing for querying the database as discussed above.

Figure 9:
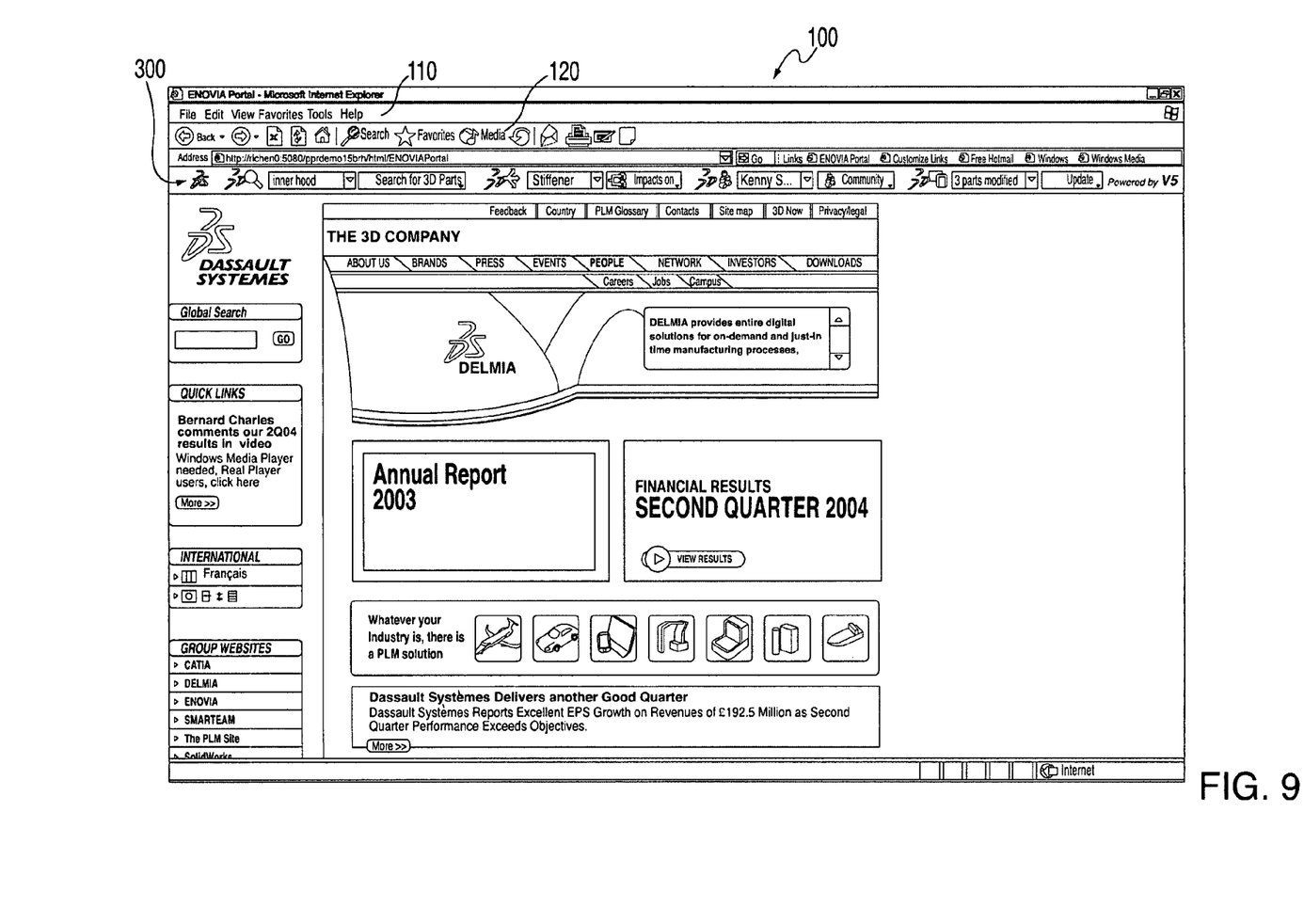
FIG. 9 is an exemplified display of a web browser graphical user interface, for on-line work, having a toolbar installed, according to an embodiment of the invention.

FIG. 9 is an exemplified display of a web browser graphical user interface, for on-line work, having a toolbar embedded, according to an embodiment of the invention.

Again, such a GUI comprises a standard menu bar 110, a web-like command bar 120 and the toolbar 300, as in FIG. 8. Such a GUI 100 is suitable for on-line work. For example, it may allow a user to access a remote database, e.g. a client database outside user's local network, via the internet network. Thus, the working environment of the user is different: the user is still working on the enterprise database but may for example look for some parts over the internet or on other connected databases. To this aim, the user can conduct "Search" queries (like those described in relation to FIG. 2) among other databases (clients, suppliers, partners . . . ), thus increasing the search possibilities.

A designer may thus download remote data for subsequent CAD/CAM work using a unique GUI.

Notice further that in a Microsoft (trademark) "windows" environment, standard Microsoft (trademark) tools may be used to carry out the invention.

In a web environment, the method and the system according to the invention use various known protocols and languages such as HTML, DHTML or Java (trademark). Web browsers like Microsoft Internet Explorer (trademark) or Mozilla and application server such as IBM Websphere (trademark) or Microsoft NET (trademark) may advantageously be used to implement the invention.

The invention claimed is:

1. A computer-implemented method for interacting with a database having data related to modeled products and product parts, the method comprising;

(a) displaying a graphical user interface on a display of a computer, the graphical user interface being configured to allow a user to access the database;

(b) providing within the graphical user interface a toolbar with at least one field suitable for displaying an argument, the toolbar being configured to allow the user to select a function that uses said argument;

(c) querying the database to determine an update of said argument;

(d) updating the argument displayed in the field based on the querying step; and (e) executing the function.

2. The method of claim 1, wherein the steps of querying and updating are a continuous process performed at a regular rate.

3. The method of claim 1, wherein the steps of querying and updating are carried out upon an action of the user at the GUI.

4. The method of claim 3, wherein the action is a selection of an element of a displayed product or part.

5. The method of claim 1, wherein the computer is connected to a computer network and wherein the steps of querying and updating are upon action at another computer connected to the network.

6. The method of claim 1, wherein the toolbar further comprises a button suitable for user-selection of the function.

7. The method of claim 6, wherein the function is product or part search, the method further comprising a step of:
  displaying a product or part upon execution of the function of product and/or part search, according to the updated argument.

8. The method of claim 6, wherein the function is assessing impact of a product or part, the method further comprising steps of:
  selecting a displayed product or part;
  displaying, as an updated attribute, a name of said selected product or part in an input field; and
  displaying a graph representative of an impact assessment of the selected product or part upon execution of the function of impact assessment.

9. The method of claim 6, wherein the function is communication between the user and another user of the computer network, the method further comprising:
  selecting a displayed product or part;
  displaying as an updated attribute the name of a locker of said selected product or part in an input field; and
  displaying in the graphical user interface a communication tool suitable for communication between the user and said locker upon execution of the function of communication.

10. The method of claim 6, wherein the function is update of the database, the method further comprising:
  modifying one or more parts;
    displaying as an updated attribute the name of the modified parts in the input field; and
    displaying an update tool suitable for updating the database with data related to the product and/or part, upon execution of the function of update of the database.

11. The method of claim 1, wherein the toolbar comprises:
  a first toolbar area associated with a function of searching a product or part search;
  a second toolbar area associated with a function of assessing impact of a product or part;
  a third toolbar area associated with a function of communication via a computer network with other users of the computer network; and
  a fourth toolbar area associated with a function of executing an update of the database with data related to an edited product or part.

12. The method of claim 11, further comprising the steps of:
  displaying a product or a product part upon execution of the function of product and/or part search;
  displaying a graph representative of an impact assessment of a product or part upon execution of the function of impact assessment;
  displaying in the graphical user interface a communication tool suitable for communication between the user and the other user upon execution of the function of communication; and
  displaying an update tool suitable for updating the database with data related to the product or part, upon execution of the function of update of the database.

13. The method of claim 1, wherein the database queried comprises data representative of three-dimensional modeled parts, and the graphical user interface is further configured to display a three-dimensional representation of the parts.

14. The method of claim 1, wherein the graphical user interface displayed is a web browser interface.

15. The method of claim 1, wherein the graphical user interface displayed is associated with a CAD/CAM/CAE software application.

16. A non-transitory data storage medium comprising storage instructions configuring a computer to interact with a database having data related to modeled products and product parts, the instructions configuring the computer to:
  (a) display a graphical user interface, the graphical user interface being configured to allow a user to access a database;
  (b) provide, within the graphical user interface, a toolbar with at least one field suitable to display an argument, the toolbar being configured to allow the user to select a function that uses said argument;
  (c) query the database to determine an update of the argument;
  (d) update the argument displayed in the field based on the query;
  (e) execute the function.

17. A computer system comprising:
  a computer processor, said computer processor configured to:
  execute a graphical user interface enabling user interaction with a database comprising data related to modeled products and product parts, said graphical user interface being configured to allow a user to access the database and further comprising a toolbar with at least one field suitable for displaying an argument, said toolbar being configured to allow the user to select a function that uses said argument;
  query the database to determine an update of the displayed argument; and
  update the argument displayed in the field based on the query of said database; and
  execute the function.

18. A computer-implemented method for interacting with a database having data related to modeled products and product parts, the method comprising:
  (a) displaying a graphical user interface on a display of a computer, the graphical user interface being configured to allow a user to access the database;
  (b) providing within the graphical user interface a toolbar with at least one field suitable for displaying an argument, the toolbar being configured to allow the user to select a function that uses said argument;
  (c) query the database to determine an update of the displayed argument;

(d) updating the argument displayed in the field, based on the querying step; and
(e) executing the function, wherein
the toolbar comprises:
- a first toolbar area associated with a function of searching a product or part;
- a second toolbar area associated with a function of assessing impact of a product and/or part;
- a third toolbar area associated with a function of communication via a computer network with other users of the computer network; and
- a fourth toolbar area associated with a function of executing an update of the database with data related to an edited product or part.

* * * * *